July 12, 1949.　　　　C. P. LEESE　　　　2,476,200
FRICTION BOLSTER SPRING
Filed Oct. 2, 1943　　　　　　　　　　　　3 Sheets-Sheet 2
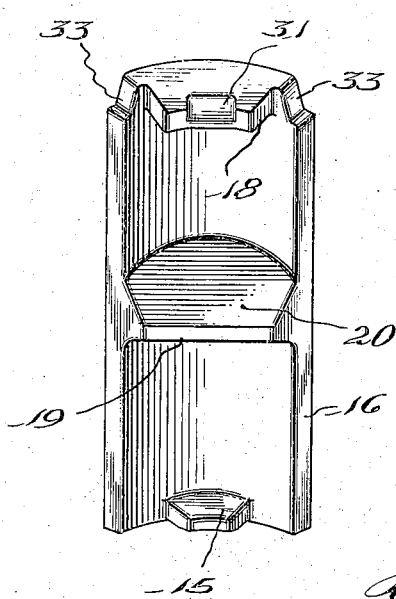
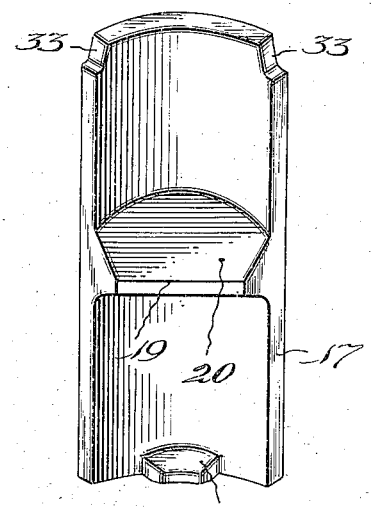
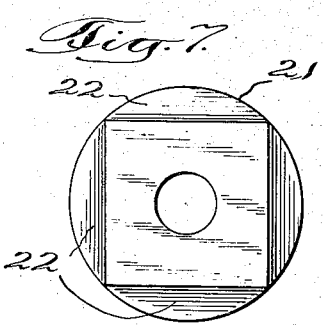
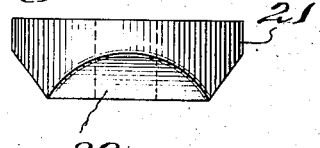
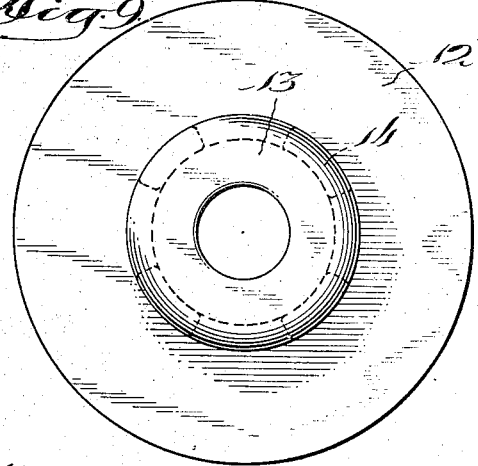
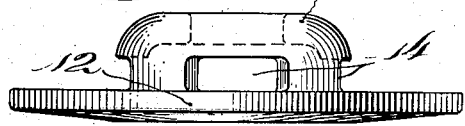
INVENTOR.
Charles P. Leese
BY Barnett + Truman
Attorneys July 12, 1949.  C. P. LEESE  2,476,200
FRICTION BOLSTER SPRING
Filed Oct. 2, 1943  3 Sheets-Sheet 3
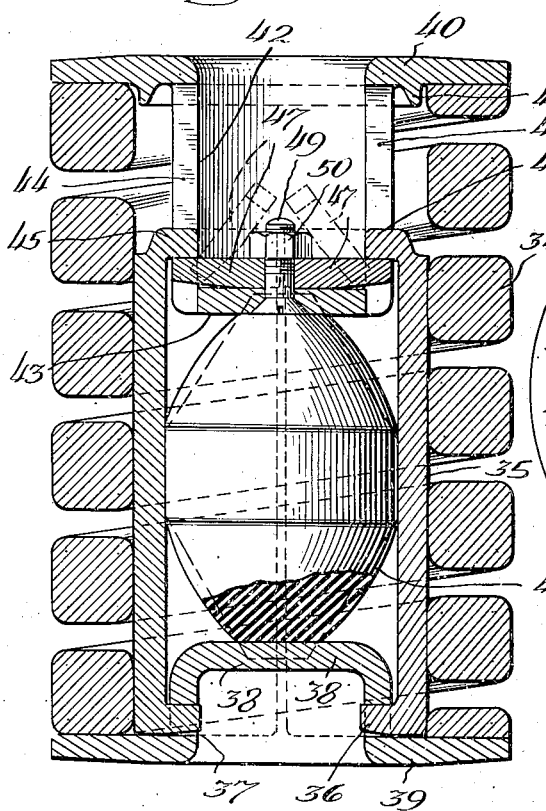
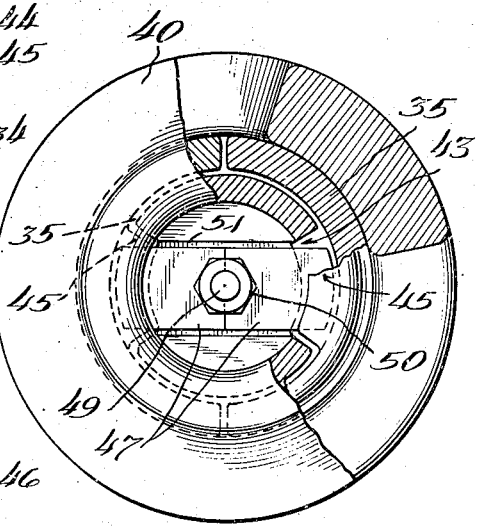
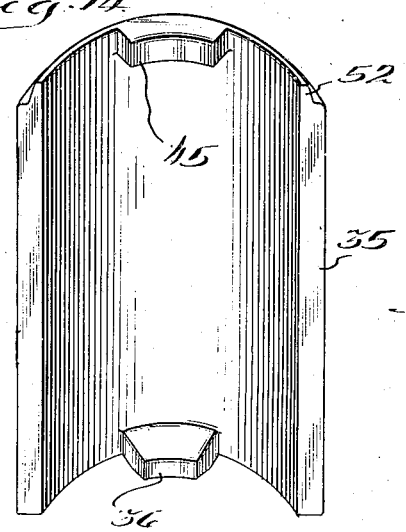
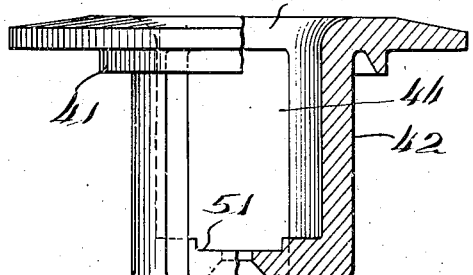
INVENTOR.
Charles P. Leese
BY Barnett & Truman
attorneys Patented July 12, 1949

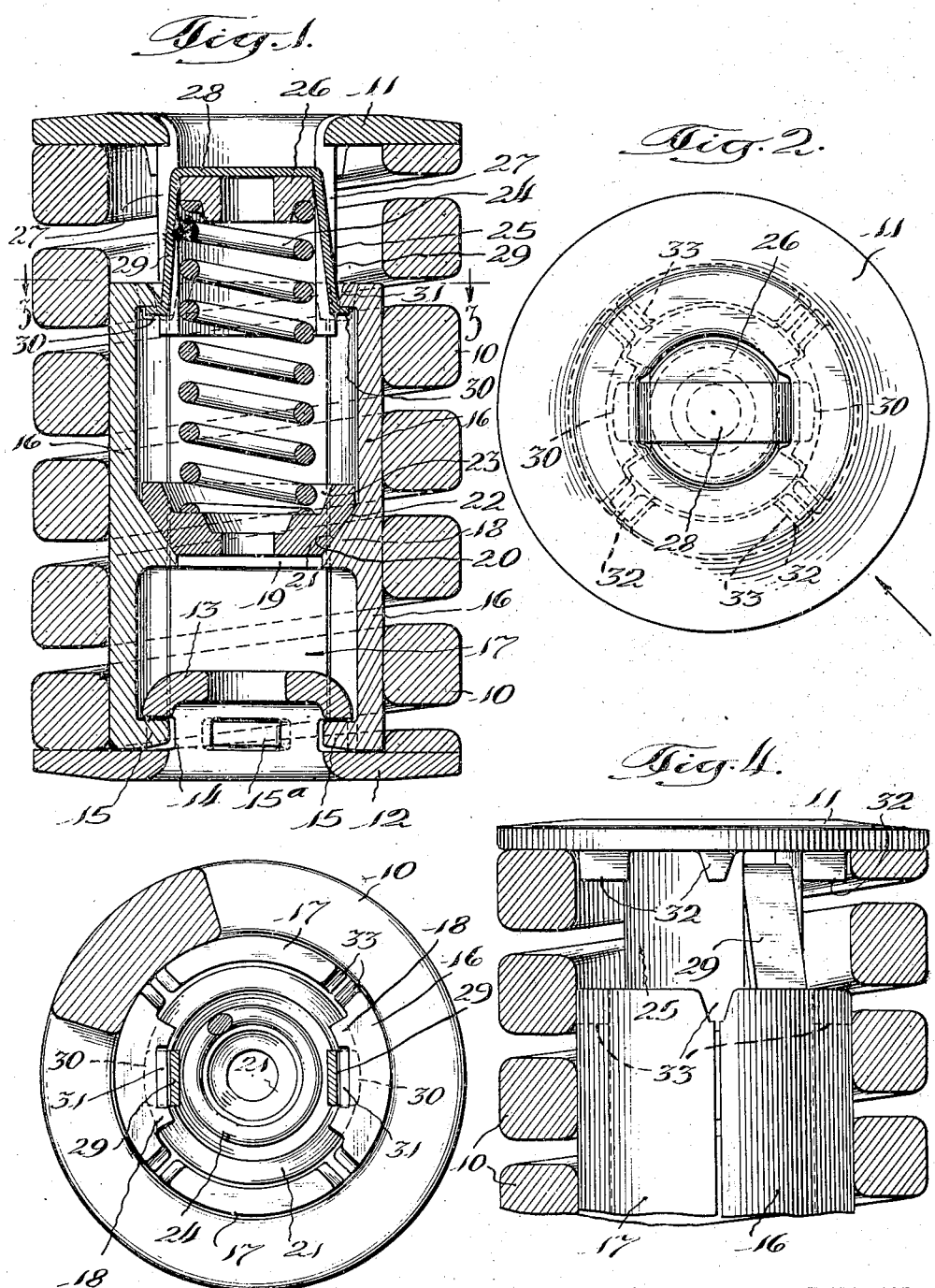

2,476,200

UNITED STATES PATENT OFFICE 2,476,200

FRICTION BOLSTER SPRING

Charles P. Leese, Chicago, Ill., assignor to Standard Car Truck Company, Chicago, Ill., a corporation of New Jersey Application October 2, 1943, Serial No. 504,681

12 Claims. (Cl. 267—9)

This invention relates to friction spring assemblies for supporting the bolster of a railway car truck. A principal object of the invention is to provide certain new and useful improvements in friction spring assemblies of this general class which simplify the construction of the several parts whereby they may be easily assembled into a unitary structure in which all parts are maintained in position by the resilient reaction of one or more elements of the assembly.

The present invention includes the provision of upper and lower follower plates, a load supporting helical spring interposed between the follower plates, and means functioning to apply friction directly against the inner surfaces of said spring so as to dampen the spring action and thereby prevent the development of harmonic or excessive vibrations during the movement of the car along the track.

The friction applying means includes a plurality of vertically disposed shoes arranged within the load supporting spring and loosely linked with the upper and lower follower plates so as to maintain the load supporting spring normally under sufficient compression to prevent accidental displacement of the various movable parts. The linked connection of the shoes with said follower plates permits the plates to move toward each other but limits their outward movement and at the same time permits the shoes to move readily outwardly to exert pressure against the inner surfaces of the load supporting spring.

The means for pressing the shoes against the load supporting spring, in one embodiment of the invention, includes a spring interposed between one of the follower plates and a thrust wedge member, the latter of which, upon compression of the spring exerts lateral pressure on the shoes at locations midway between their upper and lower ends and thereby forces the shoes against the load spring with a pressure which is uniform throughout the full length of the shoes.

In another embodiment, the shoes are pressed radially outwardly by means of a rubber core interposed between the upper and lower follower plates and normally bearing against the shoes only at a location midway between the upper and lower edges thereof, whereby endwise pressure against the said resilient core results in uniformly expanding the core against said middle portion of the shoe.

It is, therefore, a specific object of the present invention to provide an improved friction spring assembly of the type briefly described hereinabove and disclosed more in detail in the specification which follows.

The invention is illustrated in two specific embodiments in the accompanying drawings wherein—

Fig. 1 is a vertical section view of a friction spring assembly constructed in accordance with this invention.

Fig. 2 is a plan view of the structure shown in Fig. 1.

Fig. 3 is a sectional view taken on line 3—3 of Fig. 1 looking in the direction indicated by the arrows.

Fig. 4 is a fragmentary view partly in section of the upper portion of the spring assembly, viewing the said assembly from a location substantially as indicated by the feathered arrow in Fig. 2.

Fig. 5 is a view in perspective of one of the friction shoes employed in the assembly shown in Fig. 1.

Fig. 6 is a view in perspective of another form of shoe used in said Fig. 1.

Figs. 7 and 8 are bottom and side views, respectively of a thrust wedge member.

Figs. 9 and 10 are top and side views, respectively, of the lower follower plate for the embodiment shown in Fig. 1.

Fig. 11 is a vertical section through a modified spring assembly.

Fig. 12 is a plan view of the structure shown in Fig. 11 with parts broken away and shown in section to illustrate the manner in which certain parts fit within others and show also the manner in which the locking plates engage the shoes to maintain the various elements of the assembly in their operating positions.

Fig. 13 is a view partly in side elevation and partly in vertical section of the upper follower plate of the assembly shown in Fig. 11.

Fig. 14 is a view in perspective of one of the shoe members; and

Fig. 15 is a view in perspective of the locking plates for interlocking the shoe members with the upper follower plate.

Referring first to Figs. 1 to 10, inclusive, of the drawings:

10 designates the load supporting spring interposed between upper and lower follower plates 11 and 12. The spring 10 is preferably made from substantially rectangular stock so as to provide flat, inner surfaces of substantial area against which the friction elements of the assembly are adapted to bear. The lower follower plate 12 includes a base portion having a diameter corresponding to the diameter of the load spring and provided with a centrally disposed hub portion 13 formed with a series of slots 14. The slots are formed in the follower plate in close relation to the base portion thereof and are adapted to receive laterally projecting lugs 15—15a formed at the lower ends of friction shoe members 16—17, respectively. There are preferably four shoe members of arcuate configuration in cross section so that when they are arranged in their operative position, they form a cylindrical structure adapted to bear against the inner faces of the load supporting spring 10. While it is indicated that four shoe members are preferred in the present construction, this is not intended as a limitation since, obviously, any greater or lesser number of shoes may be used if desired. The shoe members are of identical construction except that the two opposing shoes designated 16 are provided at their upper ends with an inwardly projecting flange 18, whereas the upper edge of the two opposing shoes designated 17 are made plain. Each shoe 16—17 is provided at a location between its upper and lower edges with inwardly projecting flanges 19, the upper surfaces 20 of which incline downwardly and inwardly to provide wedge-like faces. A thrust wedge member 21 is formed with four wedge faces 22 corresponding in inclination to the inclined surfaces 20 of the said shoes. The wedge faces 22 of the member 21 are adapted to seat on the inclined surfaces 20 of the several shoe members. It will be observed in this connection that the application of pressure to the upper portion of the wedge member 21 exerts a lateral pressure on the shoe members 16—17 so as to force them radially outwardly against the inner flat faces of the load supporting spring and that such frictional pressure against the said spring will function to resist vertical movement of the spring. The upper face of the thrust wedge 21 is provided with a depression 23 which serves as a seat for an inner helical spring 24 which functions to apply pressure to the upper portion of said thrust wedge whereby, the wedge, as indicated, forces the shoes radially outwardly into frictional engagement with the shoes so as to dampen the action of the load spring. The upper end of the said spring 24 extends into a cylindrical guide 25 depending from the upper follower plate 11 and engages a horizontally disposed abutment 26 formed integrally with the said cylindrical guide 25. The said cylindrical guide, at opposite sides thereof, is provided with vertical slots 27—27 extending from the lower end of the guide to the bottom surface of the follower plate 11. The load supporting spring 10 and the inner spring 24 are normally held compressed by means of a substantially U-shaped retainer member 28, the central portion of which seats on the abutment 26 and the opposite legs 29—29 of which extend through the vertical slots 27—27 of the cylindrical guide 25. The lower ends of the said legs 29—29 are bent laterally to provide lugs 30—30 adapted to project beneath the lateral flanges 18—18 of the friction shoe 16—16. Preferably the said flanges 18—18 are formed with cam surfaces 31—31 for engaging the ends of the lugs 30—30 during the applying movement of the said retainer 28 and serve to flex the said legs toward each other until the lugs 30—30 clear the lower edges of the flanges 18—18, whereupon the resilience of the legs 29—29 will cause the lugs 30—30 to snap into the locking position shown in Fig. 1 of the drawing. The under surface of the upper follower plate 11 is formed with a plurality of integral wedge members 32, which serve as spacing elements for centering the upper follower on the spring 10. When the spring 10 is fully compressed, the wedges 32 will fit within the space defined by the recessed upper corners of the shoes as indicated at 33.

In assembling the various parts, the shoe members 16—17 are first engaged with the lower follower plate 12, the spring 10 is then slipped over the shoe members so as to hold them in place while the thrust wedge 21 and the inner spring 24 are applied in their operative positions. The upper follower plate is then applied and the legs 29—29 of retainer 28 are inserted through the slots 27—27 of the guide portion 25 of said upper plate. Lengthwise pressure is then applied to compress both springs 10 and 24 sufficiently to permit the locking lugs 30—30 of the spring retainer to be engaged beneath the flanges 18—18 of the shoes 16—16. It will be observed that the springs 10 and 24 are, therefore, normally held under compression so that all parts of the device are held in their operative positions by the resilient force exerted by the springs 10 and 24.

Referring now to the embodiment illustrated in Figs. 11 to 15, inclusive: The load supporting spring is herein designated by the reference numeral 34. It may be and preferably is of the same general construction as the spring 10 of the previously described embodiment. The friction shoes 35 of this modification are preferably semi-circular since only two shoes are employed. However, any greater number of shoes may be used if so desired. The lower end portion of the shoes are provided with inwardly projecting lugs 36 which are inserted in openings 37 formed in the central hub portion 38 of the lower follower plate 39. An upper follower plate 40 is supported on the upper end of the spring 34. A depending ring flange 41 on the under surface of the plate 40 serves to hold its center relative to the spring 34. The plate 40 is also provided with a depending cylindrical portion 42, the bottom of which is closed, as indicated at 43. The said cylindrical portion 42 extends into and is vertically movable within the cylindrical space defined by the shoes 35—35. The opposite sides of the said cylindrical portion 42 are formed with slots 44—44 to receive inwardly projecting flanges 45 formed integrally with the upper end portions of the shoes 35. The slots 44 which receive the flanges 45 and likewise the slots 37 which receive the inwardly projecting lugs 36 are of such sizes as to permit free movement of the shoes. A resilient element 46, preferably a rubber core, is interposed between the central portion 38 of the lower follower and the bottom closure 43 of the upper follower. The core is normally of the configuration indicated in dotted lines in Fig. 11 but is normally held under compression so that it is expanded laterally to exert pressure outwardly against the shoes 35 at a location midway between the upper and lower ends of the shoes. The core is held compressed and consequently the various movable parts are located in their position by means of complementary locking plates 47—47 which are clamped by means of a bolt 49 and nut 50 in a recess 51 formed in the upper surface of the bottom portion 43 of the follower plate 40. In order to insert the locking plates 47—47 in their operating positions, it is necessary to compress the springs 10 so as to move the portion 43 of the upper follower downwardly a substantial distance below the inwardly projecting lugs 45 of the shoes. When the spring 34 and rubber core is thus compressed, the locking plates 47—47 may be inserted to their operative positions in the manner indicated by dotted lines in Fig. 11. The bolt 49 and nut 50 securely fasten the locking plates in their operating position so that their ends, engaging the under surfaces of the lugs 45, hold the spring 34 and the core 46 under suitable compression to prevent accidental disengagement of the parts. It will be observed that by applying pressure to either of the follower plates 39 or 40 to compress the spring 34 will result in further compression of the resilient core 46 and, therefore, exert a lateral pressure on the central portion of the shoes 35—35 to increase the frictional pressure of the shoes 35 against the inner faces of the coils of spring 34. This lateral pressure, therefore, serves to dampen the action of the load spring so as to prevent the development of harmonic or excessive vibratory movements.

It will be observed that regardless of the amount of compression applied to the resilient core, the lateral pressure is exerted against the shoes 35 at locations midway between the upper and lower ends thereof. Consequently, the pressure thus applied is distributed uniformly throughout the full length of the shoes to the inner surfaces of the several coils of the spring 34. When the compression is relieved from the spring 34 and from the core 46, the reflex of these members insures the return of the operating parts to their normal positions. When the spring 34 is fully compressed, the flange 41, formed on the follower plate 40, will seat against the tapered upper portion 52 of the shoes.

I claim:

1. A friction spring assembly comprising upper and lower follower members, the latter of which is provided with an upwardly dished circular center portion with spaced apart slots formed in the vertical walls thereof, a load supporting helical spring interposed between said followers, and means for damping the spring movements comprising a plurality of friction shoes having curved inner faces and having inwardly extending lugs spaced from the vertical edges of the shoes at their lower ends and extending into said slots to provide a loose linkage with said lower follower, means providing a loose linkage between the upper ends of said shoes and the upper follower, the said shoes being arranged within the spring so as to bear directly against the inner perimeter thereof, and means including a resilient member extending lengthwise of the assembly in the space defined by said shoes and engaged by one of said followers for exerting resilient force to press said shoes outwardly against said spring.

2. A friction spring assembly comprising upper and lower followers, a load supporting helical spring interposed between and engaging said followers and means for damping the spring movements comprising a plurality of friction shoes interlinked with one of said followers and arranged within the load supporting spring so as to bear directly against the inner perimeter thereof, means including a wedge member supported on said shoes and a resilient element interposed between said wedge member and one of said followers and adapted to be compressed by inward movement of either follower to apply lateral pressure to said shoes and thereby force the said shoes radially outwardly into frictional engagement with said spring.

3. A friction spring assembly comprising upper and lower followers, a load supporting helical spring interposed between and engaging both followers, means providing a loose linkage between said followers comprising a plurality of friction shoes interlinked with one of said followers and arranged to bear against the inner perimeter of said spring to dampen its lengthwise movements, means engaging the other follower and the other end of said shoes for maintaining the load spring partially compressed, and means for urging the shoes radially outwardly against the load spring including means providing inwardly projecting inclined surfaces on the shoes, a wedge member engaging said inclined surfaces, and a resilient member disposed between and engaging said wedge member and one of said followers for exerting resilient pressure against said wedge.

4. A friction spring assembly comprising upper and lower followers, a load supporting helical spring interposed between and engaging both followers, means providing a loose linkage between said followers comprising a plurality of friction shoes interlinked with the lower follower and arranged to bear against the inner perimeter of said spring to dampen its lengthwise movements, means engaging the upper follower and slidably engaging the other end of said shoes for maintaining the load spring partially compressed, but with capacity for relative movement of the upper follower and said shoes toward each other upon further compression of the load spring, and means for urging the shoes radially outwardly against the load spring including means providing inwardly projecting inclined surfaces on the shoes, a wedge member engaging said inclined surfaces, and a resilient member disposed between said wedge member and said upper follower for exerting resilient pressure against said wedge.

5. A friction spring assembly comprising upper and lower followers, a load supporting helical spring interposed between and engaging both followers, a plurality of friction shoes interlinked with the lower follower and arranged to bear against the inner perimeter of said spring to dampen its lengthwise movements, means engaging the upper follower and slidably engaging the other end of said shoes for maintaining the load spring normally partially compressed, but with capacity for relative movement of the upper follower and said shoes toward each other upon further compression of the load spring, and means for urging the shoes radially outwardly against the load spring including means providing inwardly projecting inclined surfaces on the shoes disposed substantially midway between the ends thereof, a wedge member engaging the said inclined surfaces, and means for applying pressure on said wedge lengthwise of the assembly to force said shoes into frictional engagement with the spring.

6. A friction spring assembly comprising upper and lower followers, a load supporting helical spring interposed between and engaging both followers, a plurality of friction shoes interlinked with the lower follower and arranged to bear against the inner perimeter of said spring to dampen its lengthwise movements, means comprising a member having a portion engaging the upper follower and an end portion slidably engaging one of said shoes for normally maintaining the load spring normally partially compressed but with capacity for relative movement of the upper follower and said shoes toward each other upon further compression of the load spring, and means for urging the shoes radially outwardly against the load spring including means providing inwardly projecting inclined surfaces on the shoes disposed substantially midway between the ends thereof, a wedge member engaging said inclined surfaces, and a resilient member disposed between and engaging said wedge member and the upper follower for exerting resilient pressure against said wedge.

7. A friction spring assembly comprising upper and lower followers, a load supporting helical spring interposed between and engaging both followers, a plurality of friction shoes interlinked with the lower follower and arranged to bear against the inner perimeter of said spring to dampen its lengthwise movements, means comprising a member having an intermediate portion engaging the upper follower and resilient end portions adapted to move by their resilience into locking engagement with oppositely disposed shoes for holding the load spring normally partially compressed, and means for urging the shoes radially outwardly against the load spring including means providing inwardly projecting inclined surfaces on the shoes, a wedge member engaging said inclined surfaces, and a resilient member disposed between and engaging said wedge member and the upper follower for exerting resilient pressure against said wedge.

8. A friction spring assembly comprising a helical load supporting spring made from stock of rectangular cross-section so as to provide the inner faces of the coils with relatively wide friction surfaces, a lower follower formed with a hub portion, a plurality of friction shoes having loose interlocking engagement with said lower follower and positioned between said hub portion and the inner perimeter of the spring so as to maintain the parts centered in respect to the spring and adapted to frictionally engage throughout their length the said inner perimeter of the spring, an upper follower positioned on the other end of the load supporting spring and having a centrally disposed cylindrical portion extending into the space defined by said shoes and having vertical slots in the opposite sides thereof, there being inwardly projecting flanges on the upper ends of the shoes arranged adjacent said slots, a U-shaped retainer engaging said upper follower and having flexible resilient leg portions which extend through said slots and engage beneath the inwardly projecting flanges of said shoes for holding the load spring normally partially compressed but with capacity for relative movement of said upper follower and said shoes toward each other upon further compression of the load spring and means positioned within the space defined by said shoes for applying pressure to the middle portion thereof to force them outwardly into increasing frictional engagement with the said load spring.

9. A friction spring assembly comprising a helical load supporting spring, a lower follower formed with a hub portion, a plurality of friction shoes having loose interlocking engagement with said lower follower and positioned between said hub portion and the inner perimeter of the load spring to maintain the parts centered in respect to the spring and adapted to frictionally engage throughout their length the inner perimeter of said spring, an upper follower positioned on the other end of the load spring and having a centrally disposed cylindrical portion closed at its lower end and extending into the space defined by said shoes, and having also vertical slots in the opposite sides of the cylindrical portion, there being inwardly projecting flanges on the upper ends of said shoes adapted to project into said vertical slots, locking means interposed between a portion of said upper follower and the inwardly projecting flanges at the upper end of said shoes to limit the outward movement of the followers, whereby said load spring may be normally maintained partially compressed, and means compressible in a direction lengthwise of the assembly for exerting lateral pressure against said shoes to force them into increasing frictional engagement with said spring.

10. A friction spring assembly comprising a helical load supporting spring, a lower follower formed with a hub portion, a plurality of friction shoes having loose interlocking engagement with said lower follower and positioned between said hub portion and the inner perimeter of the load spring to maintain the parts centered in respect to the spring and adapted to frictionally engage throughout their length the inner perimeter of said spring, an upper follower positioned on the other end of the load spring and having a centrally disposed cylindrical portion closed at its lower end and extending into the space defined by said shoes, and having also vertical slots in the opposite sides of the cylindrical portion, there being inwardly projecting flanges on the upper ends of said shoes adapted to project into said vertical slots, locking means interposed between a portion of said upper follower and the inwardly projecting flanges at the upper end of said shoes for limiting the outward movement of said followers, whereby said load spring may be normally maintained partially compressed, and a resilient core arranged within the space defined by said shoes and engaging both the upper and the lower follower and the middle portion only of said shoes, whereby further compression of the load spring expands the resilient core to exert lateral pressure against the inner portion of the shoes and thereby forces them into increasing frictional engagement against said spring.

11. A friction spring assembly comprising a helical load supporting spring, a lower follower formed with a hub portion, a plurality of friction shoes having loose interlocking engagement with said lower follower and positioned between said hub portion and the inner perimeter of the load spring to maintain the parts centered in respect to the spring and adapted to frictionally engage throughout their length the inner perimeter of said spring, an upper follow positioned on the other end of the load spring and having a centrally disposed cylindrical portion closed at its lower end and extending into the space defined by said shoes, and having also vertical slots in the opposite sides of the cylindrical portion, there being inwardly projecting flanges on the upper ends of said shoes adapted to project into said vertical slots, complementary locking plates arranged end to end and secured to the upper follower with their ends engaging under the inwardly projecting flanges at the upper end of said shoes to limit outward movement of said followers, whereby said load spring may be normally maintained partially compressed, and means compressible in a direction lengthwise of the assembly for exerting lateral pressure against said shoes to force them into increasing frictional engagement with said spring.

12. A friction spring assembly comprising a helical load supporting spring, a lower follower provided with a hub portion formed with slots therein, an upper follower formed with a depending centrally disposed cylindrical portion closed at its bottom and formed at opposite sides with vertical slots, a pair of semi-circular friction shoes formed with lugs at their lower ends adapted to engage in the slots of the lower follower and having inwardly projecting flanges at their upper ends adapted to extend movably into the slots of the said center cylindrical portion of the upper follower, and complementary locking plates clamped to the bottom of said center cylindrical portion and projecting beneath the upper flanges of said shoes to lock the said shoes and the upper follower together with capacity for lengthwise movement of the followers relative to the shoes, and a compressible core maintained under partial compression between the upper and lower followers and having a middle portion for engagement with the shoes at a location substantially equi-distant from the upper and lower ends thereof, whereby further compression of the core exerts lateral pressure against the middle portion of the shoes to press them against the inner perimeter of the spring.

CHARLES P. LEESE.

REFERENCES CITED

The following references are of record in the file of this patent:

UNITED STATES PATENTS

| Number | Name | Date |
|---|---|---|
| 1,894,716 | Sproul | Jan. 17, 1933 |
| 1,930,695 | Sproul | Oct. 17, 1933 |
| 1,935,796 | Haseltine | Nov. 21, 1933 |
| 1,961,406 | Tucker | June 5, 1934 |
| 2,097,523 | Hedgcock et al. | Nov. 2, 1937 |
| 2,123,702 | Lerch | July 12, 1938 |
| 2,205,098 | Lamont | June 18, 1940 |
| 2,216,473 | Hobson | Oct. 1, 1940 |
| 2,256,485 | Krauser | Sept. 23, 1941 |
| 2,271,486 | Light | Jan. 27, 1942 |

FOREIGN PATENTS

| Number | Country | Date |
|---|---|---|
| 4,120 | Great Britain, 1913 | Feb. 18, 1914 |